(12) United States Patent
Kissin

(10) Patent No.: US 6,245,705 B1
(45) Date of Patent: *Jun. 12, 2001

(54) COCATALYSTS FOR METALLOCENE-BASED OLEFIN POLYMERIZATION CATALYST SYSTEMS

(75) Inventor: Yury V. Kissin, East Brunswick, NJ (US)

(73) Assignee: Univation Technologies, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 21 days.

(21) Appl. No.: 08/786,014

(22) Filed: Jan. 21, 1997

Related U.S. Application Data

(63) Continuation of application No. 08/153,849, filed on Nov. 18, 1993, now abandoned.

(51) Int. Cl.$^7$ ........................................................ B01J 31/00
(52) U.S. Cl. ..................... 502/117; 502/104; 502/115; 526/943
(58) Field of Search .................................. 502/104, 115, 502/117; 526/943

(56) References Cited

U.S. PATENT DOCUMENTS

| | | | |
|---|---|---|---|
| 4,404,344 | 9/1983 | Sinn et al. | 526/160 |
| 4,542,199 | 9/1985 | Kaminsky et al. | 526/160 |
| 5,077,255 | * 12/1991 | Welborn, Sr. | 502/104 |
| 5,086,135 | 2/1992 | Kissin | 526/151 |
| 5,171,799 | * 12/1992 | Kioka et al. | 502/117 |
| 5,223,465 | * 6/1993 | Ueki et al. | 502/117 |
| 5,258,475 | 11/1993 | Kissin | 526/129 |
| 5,308,816 | 5/1994 | Tsutsui et al. | 502/108 |
| 5,324,800 | 6/1994 | Welborn et al. | 526/160 |
| 5,332,706 | 7/1994 | Nowlin et al. | . |
| 5,397,757 | 3/1995 | Mink et al. | 502/115 |
| 5,420,220 | 5/1995 | Cheruvu et al. | . |
| 5,506,184 | 4/1996 | Kissin | 502/115 |
| 5,554,704 | 9/1996 | Burkhardt et al. | . |

FOREIGN PATENT DOCUMENTS

| | | |
|---|---|---|
| 0363029 | * 4/1990 | (EP) . |
| WO 94/14856 | 7/1994 | (WO) . |
| WO 94/21691 | 9/1994 | (WO) . |
| WO 95/11263 | 4/1995 | (WO) . |
| WO 95/13305 | 5/1995 | (WO) . |
| WO 95/13306 | 5/1995 | (WO) . |

OTHER PUBLICATIONS

German Dissertation of Kulper (U.Hamburg 1985) with portions translated.
German Dissertation of Andresen (U.Hamburg 1980) with portions translated.
German Dissertation of Hahnsen (U.Hamburg 1985) with portions translated.
Diplomarbeit of Kulper (Master's thesis, U.Hamburg 1980) with portions translated.
German Dissertation of Herwig (U.Hamburg) with portions translated.(1979).
W. Marconi, et al., "Polymerization of mono– and di–olefins catalyzed by indenyl–derivatives of titanium in conjunction with metal–alkyls", LaChimica E L'Inductria. vol. 44, No. 3, Mar. 3, 1962., with translation.
Cheruvu. "220 File History." (Mar. 25, 1993),Application S.N. 08/036796.
Furtek. "Ultra Strength Polyethylene Resins Produced in a Fluidized–Bed Process Utilizing Metallocene–Based Catalysts." Presentation MetCon 93 Houston, Texas 1993. (May 26, 1993).
H. Sinn and W. Kaminsky, "Ziegler–Natta Catalysis", Adv. Organomet. Chem., vol. 18. 99–149. No dates available.

* cited by examiner

Primary Examiner—Elizabeth D. Wood

(57) ABSTRACT

The invention relates to unsupported or supported catalyst compositions for alpha-olefin (ethylene and/or propylene) polymerization which comprises
(1) a metallocene compound,
(2) an inorganic aluminum compound $Al(OH)_xO_y$, wherein x is a number from 0 to 3, wherein $x+2y=3$,
(3) trimethylaluminum, wherein $Al(OH)_xO_y$ is used in an amount sufficient to provide an $Al(OH)_xO_y$:metallocene molar ratio of 5 to 10,000, wherein trimethylaluminum is used in an amount sufficient to provide a trimethylaluminum:metallocene molar ratio of 50 to 10,000, and wherein the two aluminum compounds, (2) and (3), are used in amounts to provide a molar ratio of trimethylaluminum to $Al(OH)_xO_y$ in the range of from 0.1 to 100.

24 Claims, No Drawings

COCATALYSTS FOR METALLOCENE-BASED OLEFIN POLYMERIZATION CATALYST SYSTEMS

FIELD OF THE INVENTION

This application is a continuation of application Ser. No. 08/153,849 filed Nov. 18, 1993 and now abandoned.

The invention relates to cocatalysts used in polymerization and copolymerization of ethylene, undertaken in the presence of catalyst systems comprising metallocenes of transition metals. The invention relates to metallocene catalysts which do not require alumoxane to activate the catalysts or alumoxane co-feed to the polymerization reactor.

BACKGROUND OF THE INVENTION

Metallocene compounds of transition metals are used as catalyst precursors for polymerization and copolymerization of ethylene and in the stereospecific polymerization of olefins. Metallocenes can be described by the empirical formula $(CP_mMLB^1)_n(R^2)_p$. These compounds in combination with an alumoxane such as methylalumoxane (MAO) have been used to produce olefin polymers and copolymers, such as ethylene and propylene homopolymers, ethylene-butene and ethylene-hexene copolymers, e.g., see Kaminsky et al, U.S. Pat. No. 4,542,199 and Sinn et al, U.S. Pat. No. 4,404,344.

MAO has been used as a co-catalyst with various metallocenes. It comprises mixtures of oligomeric linear and/or cyclic alumoxanes with an average molecular weight of about 1200 represented by the formulas: R—(Al(R)—O)$_n$—AlR$_2$ for linear alumoxanes and (—Al(R)—O—)$_m$ for cyclic alumoxanes wherein n is 1–40, m is 3–40, and R is preferably methyl.

Use of MAO has presented problems in the development of catalysts formed from metallocenes. Because of the varying chemical makeup of the material itself, as reflected by its its formula above, it is often difficult to obtain reproducable catalyst synthesis results. If supported catalysts are prepared with combinations of metallocenes and MAO, MAO is not uniformly distributed within catalyst particles. The resulting non-homogeneous polymerization catalysts have low activity and produce resins with less attractive properties.

SUMMARY OF THE INVENTION

The invention provides cocatalyst systems for metallocenes which require no alumoxanes in catalyst synthesis or in the polymerization reactor.

The invention relates to an activated catalyst composition which comprises mixtures of:

(1) a metallocene compound,
(2) an inorganic aluminum compound Al(OH)$_x$O$_y$, wherein x is a number from 0 to 3, wherein x+2y=3
(3) trimethylaluminum (TMA),
wherein Al(OH)$_x$O$_y$ is used in an amount sufficient to provide an Al(OH)$_x$O$_y$:metallocene molar ratio of 5 to 10,000,
wherein TMA is used in an amount sufficient to provide a TMA:metallocene molar ratio of 50 to 10,000, and
wherein the two aluminum compounds, (2) and (3), are used in amounts to provide a molar ratio of TMA to Al(OH)$_x$O$_y$ in the range of from 0.1 to 100.

The invention includes the catalysts described herein, polymerizations and copolymerizations achieved thereby, and the product(s) thereof.

DETAILED DESCRIPTION OF THE INVENTION Catalyst Composition

The catalysts may be unsupported or supported, and comprise (1) a metallocene compound,
(2) an inorganic aluminum compound Al(OH)$_x$O$_y$, wherein x is a number from 0 to 3, wherein x+2y=3, and
(3) trimethylaluminum (TMA),
wherein Al(OH)$_x$O$_y$ is used in an amount sufficient to provide an Al(OH)$_x$O$_y$:metallocene molar ratio of 5 to 10,000,
wherein TMA is used in an amount sufficient to provide a TMA:metallocene molar ratio of 50 to 10,000, and
wherein the two aluminum compounds, (2) and (3), are used in amounts to provide a molar ratio of TMA to Al(OH)$_x$O$_y$ in the range of from 0.1 to 100.

The metallocene compound has the formula $CP_mM(R^1)_n(R^2)_p$ in which Cp is an unsubstituted or substituted cyclopentadienyl group, m is 1 or 2, M is titanium, zirconium or hafnium, and $R^1$ and $R^2$ belong to the group including a halogen atom, a hydrogen atom or an alkyl group. In the above formula of the metallocene compound, the preferred transition metal atom M is zirconium. In the above formula of the metallocene compound, the Cp group is an unsubstituted, a mono- or a polysubstituted cyclopentadienyl group. The substituents on the cyclopentadienyl group can be preferably straight-chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by alkyl groups, such as —CH$_2$—, —CH$_2$—CH$_2$—, —CR'R"— and —CR'R"—CR'R"—, where R' and R" are short alkyl groups or hydrogen atoms; or dialkylsilane groups, such as —Si(CH$_3$)$_2$—, Si(CH$_3$)$_2$—CH$_2$—CH$_2$—Si(CH$_3$)$_2$— and similar bridge groups. Bridged cyclopentadienyl complexes are used for stereospecific polymerization of propylene. If the R$_1$ and R$_2$ substituents in the above formula of the metallocene compound are halogen atoms, they belong to the group of fluorine, chlorine, bromine or iodine. If the substituents R$_1$ and R$_2$ in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides; wherein the metal is titanium, zirconium or hafnium, halide atoms are preferably chlorine, and the alkyl groups are $C_1$–$C_6$. Illustrative, but non-limiting examples of metallocenes include bis(cyclopentadienyl)zirconium dichloride, bis(cyclopentadienyl)hafnium dichloride, bis(cyclopentadienyl)titanium dichloride bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(n-butylcyclopentadienyl)zirconium dichloride, bis(n-butylcyclopentadienyl)hafnium dichloride, bis(n-butylcyclopentadienyl)zirconium dimethyl, bis(n-butylcyclopentadienyl)hafnium dimethyl, bis(n- butylcyclopentadienyl)zirconium hydridochloride, bis(n-butylcyclopentadienyl)hafnium hydridochloride, bis(pentamethylcyclopentadienyl)zirconium dichloride, bis(pentamethylcyclopentadienyl)hafnium dichloride, bis(pentamethylcyclopentadienyl)titanium dichloride, cyclopentadienylzirconium trichloride, cyclopentadienyltitaniun trichloride, bis (indenyl) zirconium dichloride, bis(4,5,6,7-tetrahydro-1-indenyl) zirconium dichloride, and ethylene-[bis(4,5,6,7-tetrahydro-1-indenyl)]zirconium dichloride. The metallocene compounds utilized within the embodiment of this art can be used as crystalline solids, as solutions in aromatic hydrocarbons or in a supported form.

If the metallocene is supported, the support carrier material is a particulate, porous, solid such as an oxide of silicon and/or of aluminum, or a crosslinked polymer, e.g. polystyrene. Preferably, it is an inorganic material. The carrier material is used in the form of a dry powder having an average particle size of from about 1 mircons to about 150 microns.

The surface area of the carrier is preferably at least about 50 m$^2$/g up to about 350 m$^2$/g. The carrier material should be dry, that is, free of absorbed water. Drying of the inorganic carrier material can be effected by heating at about 100° C. about 1000° C., preferably at about 600° C. When the carrier is silica, it is heated to at least 200° C., preferably about 200° C. In the most preferred embodiment, the carrier is silica which, prior to the use thereof in the catalyst synthesis, has been dehydrated by fluidizing it with nitrogen and heating at about 600° C. for about 4 to 16 hours. The silica of the most preferred embodiment is a high surface area, amorphous silica with a (surface area of 300 m$^2$/g and a pore volume of 1.65 cm$^3$/g.

In accordance with the invention, the metallocene compound is supported on the carrier. Supporting of a metallocene compound on a carrier is undertaken by dissolving the metallocene in a solvent under anhydrous conditions, slurrying the carrier in the solvent containing the metallocene in order to impregnate the carrier with the metallocene, and removing the solvent to recover a dry particulate supported metallocene. Slurrying and contact of metallocene solution with a support can be undertaken at temperatures ranging from 20° to 60° C., preferably 30° to 55° C. Solvent removal, after the impregnation, is undertaken at a temperature up to 60° C., with or without a nitrogen purge. The solvent in this step may be an aromatic, aliphatic or chlorinated hydrocarbon, an ether, a cyclic ether, an ester, or a ketone. The loading of the metallocene on the support is in the range of 0.1 to 1.0 grams per gram of support, preferably 0.25 to 0.45 grams per gram of support.

For activation, the unsupported or supported metallocene, in slurry or in solution is then contacted with Al(OH)$_x$O$_y$ and TMA.

The second component of the catalyst system of this invention, Al(OH)$_x$O$_y$, is a solid inorganic compound containing aluminum and oxygen atoms and hydroxyl groups and with x in the range from 0 to 3, wherein x+2y=3. These compounds include Al(OH)$_3$, Al(O)OH and Al$_2$O$_3$. The most preferred compounds are Al(OH)$_3$ and Al(O)OH. These solids should not contain water, either in a free or an adsorbed form. The amount of TMA in the cocatalyst composition is sufficient to give an Al:metallocene molar ratio of about 50 to about 10,000, preferably about 100 to about 1,000.

TMA and the inorganic aluminum compound Al(OH)$_x$O$_y$ can be used to contact the metallocene compound separately or as a mixture. Contact with the metallocene can be undertaken in the polymerization reactor by feeding either one or the other of TMA and Al(OH)$_x$O$_y$ seriatim to the reactor or feeding a mixture comprising TMA and Al(OH)$_x$O$_y$ to the polymerization reactor. Alternatively, activation of the metallocene can be undertaken prior to introduction of the activated catalyst into the polymerization reactor by contacting either one or the other of TMA and Al(OH)$_x$O$_y$ seriatim with the metallocene or contacting the metallocene with a mixture comprising TMA and Al(OH)$_x$O$_y$ for up to about 2 hours prior to the introduction thereof into the polymerization medium at a temperature of from about −40 to about 100° C. Activity of the cocatalysts can be increased by reacting TMA and the inorganic aluminum compound at elevated temperatures or by subjecting the binary mixture of TMA and the inorganic aluminum compound to ultrasonic irradiation.

The catalyst synthesis of the present invention is undertaken in the substantial absence of water, oxygen, and other catalyst poisons. Such catalyst poisons can be excluded during the catalyst preparation steps by any well known methods, e.g., by carrying out the preparation under an atmosphere of nitrogen, argon or other inert gas.

Polymerization

Alpha-olefins are polymerized with the catalysts prepared according to the present invention by any suitable process. Such processes include polymerizations carried out in suspension, in solution or in the gas phase.

The molecular weights of the polymers may be controlled in a known manner, e.g., by using hydrogen when the polymerization is carried out at temperatures from about 30 to about 105° C. Pressures used in polymerization reactions are preferably above ambient and below 1000 psi, more preferably below 400 psi and most preferably from 100 to 350 psi. When the catalyst of the invention is used in solution or in slurry polymerizations, aromatic solvents (e.g., toluene) and aliphatic solvents (e.g. heptane) can constitute the polymerization medium.

Linear ethylene polymers prepared in accordance with the present invention are homopolymers of ethylene or copolymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. The most preferred comonomers are 1-butene and 1-hexene. The linear low density polyethylene polymers produced in accordance with the present invention preferably contain at least about 80 percent by weight of ethylene units. It is also possible to polymerize propylene with the metallocene catalysts of the invention to produce stereoregular products.

The following examples further illustrate the essential features of the invention. However, it will be apparent to those skilled in the art that the specific reactants and reaction conditions used in the Examples do not limit the scope of the invention.

EXAMPLES

Example 1

A stainless-steel autoclave (volume 500 cc) equipped with a stirrer, a thermocouple and several ports for adding reaction components was purged with dry nitrogen and filled with 200 cc of dry n-heptane and 50 cc of 1-hexene, after which 5 cc of 20 wt. % solution of Al(CH$_3$)$_3$ in heptane and 0.2 g of Al(OH)$_3$ were added to the reactor. Temperature was raised to 70° C. and 0.5 cc of a solution of (C$_5$H$_5$)$_2$ZrCl$_2$ in toluene containing 1.7·10$^{-3}$ mmol Zr was introduced. Ethylene was added to the reactor to a total pressure of 180 psig and a polymerization reaction was continued for 60 min to yield 26.0 g of ethylene/1-hexene copolymer with a hexene content of 1.9 mol. % and an I$_2$ value of 1.1.

Example 2

Cocatalyst preparation.

An ultrasonic tool (Lab-Line Ultra Tip with a diameter of 12.5 mm, a part of a Labsonic Systems ultrasonic apparatus) was inserted into a 15 cc three-necked glass flask through its central 18 mm diameter inlet and was secured in the flask with a rubber collar. 0.20 g of Al(OH)$_3$ was added to the flask through one of its two side inlets, after which both side inlets were capped with rubber septums and the flask was purged with dry nitrogen for 15 min. Then 10 cc of dry toluene and 5 cc of 20 wt. % solution of Al(CH$_3$)$_3$ in heptane was added to the flask with syringes through one of the septums and the slurry was irradiated with ultrasound (ca. 20 watt power) for 5 min. The reaction produced a large volume of gaseous products which escaped through a needle inserted in one of the septums.

Polymerization.

An autoclave (the same as in Example 1) was purged with nitrogen and filled with 200 cc of dry heptane and 50 cc of 1-hexene, after which all contents of the flask used for preparation of the cocatalyst system, ca. 15 cc, was transferred into the reactor. Temperature was raised to 70° C. and 0.5 cc of a solution of (C$_5$H$_5$)$_2$ZrCl$_2$ in toluene containing 1.7·10$^3$ mmol Zr was introduced. Ethylene was added to the reactor to a total pressure of 180 psig and a polymerization reaction was continued for 30 min to yield 24.2 g of ethylene/1-hexene copolymer with a hexene content of 2.3 mol % and an I$_2$ value of 9.2. Measurements of the ethylene consumption rates with a gas flow-meter during this polymerization experiment showed that the polymerization rate was 60% higher than in Example 1 in which no ultrasonic irradiation was applied to the cocatalyst system.

Example 3

An autoclave (the same as in Example 1) was purged with dry nitrogen and filled with 200 cc of dry n-heptane and 50 cc of 1-hexene, after which 2 cc of 20 wt % solution of Al(CH$_3$)$_3$ in heptane and 0.1 g of Al(OH)$_3$ were added to the reactor. Temperature was raised to 70° C. and 0.25 cc of a solution of (n-C$_4$H$_9$—C$_5$H$_4$)$_2$ZrCl$_2$ in toluene containing 6.2·10$^4$ mmol Zr was introduced. Ethylene was added to the reactor to a total pressure of 180 psig and a polymerization reaction was continued for 120 min to yield 24.1 g of ethylene/hexene copolymer with a hexene content of 2.6 mol % and an I$_2$ value of 3.2.

Example 4

Cocatalyst preparation.

To an autoclave (the same as in Example 1) were added 0.10 g of Al(OH)$_3$, 10 cc of dry toluene and 2 cc of 15.5 wt. % solution of Al(CH$_3$)$_3$ in toluene. Reactor temperature was increased to 150° C., the mixture reacted at this temperature for 2 hours and then was cooled to 25° C.

Polymerization.

250 cc of dry hexane and 50 cc of dry 1-hexane were added to the reactor, its temperature was raised to 70° C. and 1 cc of a solution of (n—C$_4$H$_9$—C$_5$H$_4$)$_2$ZrCl$_2$ in toluene containing 2.5·10$^4$ mmol Zr was introduced. Ethylene was added to the reactor to a total pressure of 180 psig and a polymerization reaction was continued for 120 min to yield 27.6 g of ethylene/hexene copolymer with a hexene content of 2.8 mol % and an I$_2$ value of 0.45.

Example 5

An autoclave (the same as in Example 1) was filled with 200 cc of dry n-heptane and 50 cc of 1-hexene, after which 2 cc of 20 wt. % solution of Al(CH$_3$)$_3$ in heptane and 0.1 g of Al(OH)$_3$ were added to the reactor. Temperature was raised to 70° C. and 0.5 cc of a solution of (CH$_3$—C$_5$H$_4$)$_2$ZrCl$_2$ in toluene containing 1.6·10$^3$ mol Zr was introduced. Ethylene was added to the reactor to a total pressure of 180 psig and a polymerization reaction was continued for 120 min to yield 18.9 g of ethylene/1-hexane copolymer with a hexene content of 2.1 mol % and an I$_2$ value of 14.9.

Example 6

An autoclave (the same as in Example 1) was filled with 200 cc of dry n-heptane and 50 cc of 1-hexene, after which 2 cc of 20 wt % solution of Al(CH$_3$)$_3$ in heptane and 0.2 g of Al(OH)$_3$ were added to the reactor. Temperature was raised to 70° C. and 4.0 cc of a solution of ethylene-bis (idenyl)ZrCl$_2$ in toluene containing 4.9·10$^4$ mmol Zr was introduced. Ethylene was added to the reactor to a total pressure of 180 psig and a polymerization reaction was continued for 90 min to yield 6.8 g of ethylene/1-hexene copolymer with a hexene content of 5.8 mol % and an I$_2$ value of 21.

Example 7

A zirconocene-based supported catalyst was prepared by reacting 1.0 g of silica dehydrated at 600° C. and a solution of 0.080 g of (C$_5$H$_5$)$_2$ZrCl$_2$ in 10 cc of dry tetrahydrofuran for 10 min after which the solvent was stripped from the solid catalyst slurry by nitrogen purge at 70° C. for 2 h. An autoclave (the same as in Example 1) was filled with 200 cc of dry n-heptane and 50 cc of 1-hexene after which 2 cc of 20 wt. % solution of Al(CH$_3$)$_3$ in heptane and 0.2 g of Al(OH)$_3$ were added to the reactor. Temperature was raised to 70° C. and 0.0268 g of the above catalyst was introduced. Ethylene was added to the reactor to a total pressure of 180 psig and a polymerization reaction was continued for 60 min to yield 10.2 g of ethylene/1-hexene copolymer with a hexene content of 1.7 mol. % and an I$_2$ value of 0.50.

Example 8

An autoclave (the same as in Example 1) was filled with 200 cc of dry n-heptane and 50 cc of 1-hexene, after which 4 cc of 20 wt % solution of Al(CH$_3$)$_3$ in heptane and 0.35 g of Al(O)OH were added to the reactor. Temperature was raised to 70° C. and 1.0 cc of a solution of (C$_5$H$_5$)$_2$ZrCl$_2$ in toluene containing 3.4·10$^3$ mmol Zr was introduced. Ethylene was added to the reactor to a total pressure of 180 psig and a polymerization reaction was continued for 210 min to yield 26.4 g of ethylene/1-hexene copolymer with a hexene content of 3.0 mol % and an I$_2$ value of 4.3.

Example 9

An autoclave (the same as in Example 1) was filled with 100 cc of dry toluene and 25 cc of 1-hexene, after which 4 cc of 20 wt % solution of Al(CH$_3$)$_3$ in heptane and 0.35 g of AL(O)OH were added to the reactor. Temperature was raised to 70° C. and 0.5 cc of a solution of (n-C$_4$H$_9$—C$_5$H$_4$)$_2$ZrCl$_2$ in toluene containing 1.2·10$^3$ mmol Zr was introduced. Ethylene was added to the reactor to a total pressure of 180 psig and a polymerization reaction was continued for 120 min to yield 14.4 g of ethylene/1-hexene copolymer with a hexene content of 0.9 mol % and an $I_2$ value of 1.8.

Example 10

An autoclave (the same as in Example 1) was filled with 200 cc of dry toluene and 50 cc of 1-hexene, after which 4 cc of 20 wt % solution of $Al(CH_3)_3$ in heptane and 0.50 g of Al(O)OH were added to the reactor. Temperature was raised to 70° C. and 1.0 cc of a solution of $(C_5H_5)_2Zr(CH_3)_2$ in toluene containing $3.3 \cdot 10^3$ mmol Zr was introduced. Ethylene was added to the reactor to a total pressure of 180 psig and a polymerization reaction was continued for 120 min to yield 28.5 g of ethylene/1-hexene copolymer with a hexene content of 2.6 mol % and an $I_2$ value of 2.5.

Example 11

An autoclave (the same as in Example 1) was filled with 200 cc of dry toluene and 50 cc of 1-hexene, after which 4 cc of 20 wt % solution of $Al(CH_3)_3$ in heptane and 0.50 g of Al(O)OH were added to the reactor. Temperature was raised to 70° C. and 1.0 cc of a solution of $(C_5H_5)_2TiCl_2$ in toluene containing $4.0 \cdot 10^3$ mmol Zr was introduced. Ethylene was added to the reactor to a total pressure of 180 psig and a polymerization reaction was continued for 120 min to yield 17.0 g of ethylene/1-hexene copolymer with a hexene content of 4.0 mol % hexene.

Example 12

Cocatalyst preparation.

A 15-cc three-necked glass flask was equipped with an ultrasonic tool described in Example 2 and 0.29 g of Al(O)OH was placed in it. Then 10 cc of dry toluene and 5 cc of 20 wt. % solution of $Al(CH_3)_3$ in heptane was added to the flask and the slurry was irradiated with ultrasound (ca. 30 watt power) for 5 min.

Polymerization.

An autoclave (the same as in Example 1) was filled with 200 cc of dry toluene and 50 cc of 1-hexene, after which all contents of the flask used for preparation of the cocatalyst system, ca. 15 cc, was transferred into the reactor. Temperature was raised to 70° C. and 0.5 cc of a solution of $(C_5H_5)_2ZrCl_2$ in toluene containing $1.7 \cdot 10^3$ mmol Zr was introduced. Ethylene was added to the reactor to a total pressure of 180 psig and a polymerization reaction was continued for 50 min to yield 16.7 g of ethylene/1-hexene copolymer with a hexene content of 2.6 mol % and an $I_2$ value of 14.9. Measurements of ethylene consumption rates with a gas flow-meter during this polymerization experiment showed that the polymerization rate was 260% higher than in a similarly performed experiment in which no ultrasonic irradiation was applied to the cocatalyst system.

Example 13

Cocatalyst preparation.

To an autoclave (the same as in Example 1) were added 0.10 g of Al(O)OH, 10 cc of dry toluene and 2 cc of 15.5 wt. % solution of $Al(CH_3)_3$ in toluene. Reactor temperature was increased to 150° C., the mixture reacted at this temperature for 2 hours and then was cooled to 25° C.

Polymerization.

250 cc of dry hexane and 50 cc of dry 1-hexene were added to the reactor, its temperature was raised to 70° C. and 1 cc of a solution of $(n\text{—}C_4H_9\text{—}C_5H_4)_2ZrCl_2$ in toluene containing $2.5 \cdot 10^3$ mmol Zr was introduced. Ethylene was added to the reactor to a total pressure of 180 psig and a polymerization reaction was continued for 120 min to yield 9.5 g of ethylene/hexene copolymer with a hexene content of 3.4 mol. % and an $I_2$ value of 43.

Example 14

Cocatalyst preparation.

To an autoclave (the same as in Example 1) were added 0.10 g of $Al_2O_3$, 10 cc of dry toluene and 2 cc of 15.5 wt. % solution of $Al(CH_3)_3$ in toluene. Reactor temperature was increased to 150° C., the mixture reacted at this temperature for 2 hours and then was cooled to 25° C.

Polymerization.

250 cc of dry hexane and 50 cc of dry 1-hexene were added to the reactor, its temperature was raised to 70° C. and 1 cc of a solution of $(n\text{—}C_4H_9\text{—}C_5H_4)_2ZrCl_2$ in toluene containing $2.5 \cdot 10^4$ mmol Zr was introduced. Ethylene was added to the reactor to a total pressure of 180 psig and the polymerization was continued for 120 min to yield 3.5 g of ethylene/hexene copolymer with a hexene content of 2.0 mol. % and an $I_2$ value of 0.13.

Example 15

Gas-phase polymerization.

An autoclave (the same as in Example 1) was filled with 30 g of degassed crystalline polypropylene which served as a polymerization medium. 6 cc of 1-hexane, 0.33 g of $Al(OH)_3$ and 3 cc of 20 wt. % solution of $Al(CH_3)_3$ in heptane was added to the reactor and temperature was raised to 70° C. After that, 0.071 g of the supported catalyst described in Example 8 was introduced into the reactor. Ethylene was added to the reactor to a total pressure of 180 psig and a polymerization reaction was continued for 120 min to yield 26.3 g of ethylene/1-hexene copolymer.

Comparative Example 1

Evaluation of possible cocatalyst contamination with methylalumoxane. All inorganic compounds of aluminum of this invention may contain occluded or absorbed water. This possibility is the highest in the case of $Al(OH)_3$ and is lower for Al(O)OH or $Al_2O_3$. Interaction between water and $Al(CH_3)_3$ is known to produce methylalumoxane, which is an efficient cocatalyst for metallocenes. To evaluate possible contamination of the cocatalyst systems of this invention with methylalumoxane, a use was made of the fact that methylalumoxane is soluble in aromatic solvents such as toluene whereas the cocatalyst systems of this invention are not soluble in these solvents.

Cocatalyst preparation.

In a 40-cc centrifuge flask capped with a septum, 0.10 g of $Al(OH)_3$ was slurried in 5 cc of dry toluene, and 1 cc of 15.5 wt. % solution of $Al(CH_3)_3$ in toluene was added to it resulting in evolution of gaseous products. The slurry was reacted at 50° C. for 4 hours. After that the slurry was centrifuged and the whole liquid fraction of it was withdrawn from the flask with a syringe and was used as Cocatalyst A. The solid remaining in the flask was reslurried in 5 cc of dry toluene and was used as cocatalyst B.

Polymerization.

In two separate experiments, an autoclave (the same as in Example 1) was filled with 200 cc of dry n-heptane and 50 cc of 1-hexene, after which 1 cc of $Al(CH_3)_3$ solution in heptane was added to it to purify the reaction medium.

Polymerization Experiment A.

Clear liquid produced in the cocatalyst preparation step was added to the reactor, temperature was raised to 70° C. and 0.5 cc of a solution of $(C_5H_5)_2ZrCl_2$ in toluene containing $1.7 \cdot 10^3$ mmol Zr was introduced. Ethylene was added to the reactor to a total pressure of 180 psig and a polymerization reaction was continued for 60 min. Less than 2 g of a solid product was recovered.

Polymerization Experiment B.

The slurry of white powder produced in the cocatalyst preparation step was added to the reactor, temperature was raised to 70° C. and 0.5 cc of a solution of $(C_5H_5)_2ZrCl_2$ in toluene containing $1.7 \cdot 10^3$ mmol Zr was introduced. Ethylene was added to the reactor to a total pressure of 180 psig and a polymerization reaction was continued for 60 min. 29.7 g of ethylene/1-hexene copolymer was recovered. This example demonstrated that contamination of the cocatalyst systems of this invention with methylaluminoxane due to a possible presence of water in the inorganic compounds of aluminum in negligible.

What is claimed is:

1. A process for preparing supported alpha-olefin polymerization catalyst compositions which comprises the steps of:
    (i) providing silica which is porous and has a particle size of 1 to 200 microns, having pores which have an average diameter of 50 to 500 Angstroms and having a pore volume of 0.5 to 5.0 cc/g; and impregnating said silica with at least one metallocene compound of the formula $CP_mM(R^1)_n(R^2)_p$ wherein
        Cp is a cyclopentadienyl or a substituted cyclopentadienyl
        group; m is 1 or 2; M is a metal selected from the group consisting of titanium, zirconium and hafnium; and
        each of $R^1$ and $R^2$ is selected from the group consisting of a
        halogen atom, a hydrogen atom and an alkyl group, provided that m+n+p is equal to the valence of the metal M; thereby to Provide an impregnated catalyst precursor (1); and
    ii) combining the impregnated catalyst precursor (1) with a combination of:
        (2) an inorganic aluminum compound $Al(OH)_xO_y$, wherein x is a number from 0 to 3, wherein x+2y=3, and
        (3) trimethylaluminum,
            wherein $Al(OH)_xO_y$ is used in an amount sufficient to provide an $Al(OH)_xO_y$:metallocene molar ratio of 5 to 10,000,
            wherein trimethylaluminum is used in an amount sufficient to provide a trimethylaluminum:metallocene molar ratio of 50 to 10,000, and
            wherein the two aluminum compounds, (2) and (3), are used in amounts to provide a molar ratio of trimethylaluminum to $Al(OH)_xO_y$ in the range of from 0.1 to 100.

2. A process of claim 1 wherein $Al(OH)_xO_y$ is $Al(OH)_3$.

3. A process of claim 1, wherein $Al(OH)_xO_y$ is Al(O)OH.

4. The process of claim 1, wherein the metallocene compound is selected from the group consisting of bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is titanium, zirconium or hafnium.

5. The process of claim 1, wherein the metallocene compound is selected from the group consisting of bis(cyclopentadienyl)zirconium dichloride, bis(cyclopentadienyl)hafnium dichloride, bis(cyclopentadienyl)zirconium dimethyl, bis(cyclopentadienyl)titanium dichloride, bis(cyclopentadienyl)hafnium dimethyl, bis(cyclopentadienyl) zirconium hydridochloride, bis(cyclopentadienyl)hafnium hydridochloride, bis(pentamethylcyclopentadienyl) zirconium dichloride, bis(pentamethylcyclopentadienyl) titanium dichloride, bis(pentamethylcyclopentadienyl) hafnium dichloride, bis(n-butylcyclopentadienyl)zirconium dichloride, cyclopentadienylzirconium trichloride, cyclopentadienyltitanium trichloride, bis(indenyl)zirconium dichloride, bis(4,5,6,7-tetrahydro-1-indenyl)zirconium dichloride, and ethylene-[bis(4,5,6,7-tetrahydro-1-indenyl)] zirconium dichloride.

6. Catalyst composition for producing ethylene polymers or copolymers comprising
    (1) a metallocene, wherein the metallocene has the formula: $CP_mM(R^1)_n(R^2)_p$ wherein Cp is a cyclopentadienyl or a substituted cyclopentadienyl group; m is 1 or 2; M is a metal selected from the group consisting of titanium, zirconium or hafnium; and
    each of $R^1$ and $R^2$ is selected from the group consisting of a halogen atom, a hydrogen atom and an alkyl group, providing that m+n+p is equal to the valence of the metal M;
    (2) an inorganic aluminum compound $Al(OH)_xO_y$, wherein x is a number from 0 to 3, wherein x+2y=3,
    (3) trimethylaluminum,
        wherein $Al(OH)_xO_y$ is used in an amount sufficient to provide and an $Al(OH)_xO_y$:metallocene molar ratio of 5 to 10,000,
    wherein trimethylaluminum is used in an amount sufficient to provide a trimethylaluminum:metallocene molar ratio of 50 to 10,000, and
        wherein the two aluminum compounds, (2) and (3), are used in amounts to provide a molar ratio of trimethylaluminum to $Al(OH)_xO_y$ in the range of from 0.1 to 100.

7. The catalyst composition of claim 6, wherein $Al(OH)_xO_y$ is $Al(OH)_3$.

8. The catalyst composition of claim 7, wherein $Al(OH)_xO_y$ is Al(O)OH.

9. The catalyst composition of claim 7, wherein the metallocene is selected from the group consisting of bis(cyclopentadienyl)zirconium dichloride, bis(cyclopentadienyl)hafnium dichloride, bis(cyclopentadienyl)titanium dichloride, bis(cyclopentadienyl)zirconium dimethyl, bis(cyclopentadienyl)hafnium dimethyl, bis(cyclopentadienyl) zirconium hydridochloride, bis(cyclopentadienyl)hafnium hydridochloride, bis(pentamethylcyclopentadienyl)titanium dichloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienylzirconium trichloride, cyclopentadienyltitanium trichloride, bis(indenyl)zirconium dichloride, bis(4,5,6,7-tetrahydro-1-indenyl)zirconium dichloride, and ethylene-[bis(4,5,6,7-tetrahydro-1-indenyl)] zirconium dichloride.

10. A supported catalyst composition for producing ethylene polymers or copolymers comprising
    (1) a metallocene,
        wherein said metallocene is supported on silica, which is porous and has a particle size of 1 to 500 microns, having pores which have an average diameter of 50 to 500 Angstroms and having a pore volume of 0.5 to 5.0 cc/g; wherein the metallocene has the formula: $CP_mM(R^1)_n(R^2)_p$, wherein
            Cp is a cyclopentadienyl or a substituted cyclopentadienyl group; m is 1 or 2; the metal M; and M is a metal selected from the group consisting of titanium zirconium or hafnium; and each of $R^1$ and $R^2$ is selected from the group consisting of a halogen atom, a hydrogen atom and an alkyl group, providing that m+n+p is equal to the valence of (2) an inorganic aluminum compound $Al(OH)_xO_y$, wherein x is a number from 0 to 3, wherein x+2y=3, (3) trimethylaluminum, wherein $Al(OH)_xO_y$ is used in an amount sufficient to provide and an $Al(OH)_xO_y$:metallocene molar ratio of 5 to 10,000, wherein trimethylaluminum is used in an amount sufficient to provide a trimethylaluminum:metallocene molar ratio of 50 to 10,000, and wherein the two aluminum compounds, (2) and (3), are used in amounts to provide a molar ratio of trimethylaluminum to $Al(OH)_xO_y$ in the range of from 0.1 to 100.

11. The supported catalyst composition of claim 10, wherein $Al(OH)_xO_y$ is $Al(OH)_3$.

12. The supported catalyst of claim 10, wherein $Al(OH)_xO_y$ is Al(O)OH.

13. The catalyst composition of claim 1, wherein the metallocene is selected from the group consisting of bis(cyclopentadienyl)zirconium dichloride, bis(cyclopentadienyl)hafnium dichloride, bis(cyclopentadienyl)titanium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)titanium dichloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienylzirconium trichloride, cyclopentadienyltitanium trichloride, bis(indenyl)zirconium dichloride, bis(4,5,6,7-tetrahydro-1indenyl)zirconium dichloride, and ethylene-[bis(4,5,6,7-tetrahydro-1-indenyl)] zirconium dichloride.

14. The supported catalyst composition of claim 10, wherein the metallocene is biscyclopentadienylzirconium dichloride.

15. The supported catalyst composition of claim 10, wherein the metallocene is biscyclopentadienyltitanium dichloride.

16. A process of claim 1, which further comprises subjecting a combination of trimethylaluminum and $Al(OH)_xO_y$ to ultrasonic irradiation prior to combining it with the impregnated catalyst precursor (1).

17. A catalyst composition of claim 6, wherein a mixture of trimethylaluminum and $Al(OH)_xO_y$ is subjected to ultrasonic irradiation prior to combining it with the metallocene.

18. A supported catalyst composition of claim 10, wherein a mixture of trimethylaluminum and $Al(OH)_xO_y$ is subjected to ultrasonic irradiation prior to combining it with the supported metallocene.

19. The process of claim 1, wherein each of n and p is 0, 1, 2 or 3.

20. The catalyst of claim 6, wherein each of n and p is 0, 1, 2 or 3.

21. The catalyst of claim 10, wherein each of n and p is 0, 1, 2 or 3.

22. The catalyst of claim 10, wherein each of n and p is 1 or 2.

23. The process of claim 1, wherein each of n and p is 1 or 2.

24. The catalyst of claim 6, wherein each of n and p is 1 or 2.

* * * * *